United States Patent
Liu et al.

(10) Patent No.: US 12,004,229 B2
(45) Date of Patent: Jun. 4, 2024

(54) COMMUNICATION METHOD AND APPARATUS

(71) Applicant: GUANGDONG OPPO MOBILE TELECOMMUNICATIONS CORP., LTD., Dongguan (CN)

(72) Inventors: Yang Liu, Dongguan (CN); Xue Lin, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/235,462

(22) Filed: Aug. 18, 2023

(65) Prior Publication Data

US 2023/0397258 A1    Dec. 7, 2023

Related U.S. Application Data

(63) Continuation of application No. PCT/CN2021/102564, filed on Jun. 25, 2021.

(51) Int. Cl.
H04W 74/0833    (2024.01)

(52) U.S. Cl.
CPC ............... H04W 74/0833 (2013.01)

(58) Field of Classification Search
CPC .. H04W 74/0833; H04W 76/10; H04W 76/18
See application file for complete search history.

(56) References Cited

U.S. PATENT DOCUMENTS

| | | | |
|---|---|---|---|
| 2022/0141725 A1* | 5/2022 | Parichehrehteroujeni | ................... H04W 36/0083 370/331 |
| 2023/0119118 A1* | 4/2023 | Byun | ................ H04W 36/0055 455/442 |

FOREIGN PATENT DOCUMENTS

| | | |
|---|---|---|
| CN | 102036326 A | 4/2011 |
| CN | 110035451 A | 7/2019 |
| WO | 2020167237 A1 | 8/2020 |
| WO | 2020186403 A1 | 9/2020 |
| WO | 2021086249 A1 | 5/2021 |

OTHER PUBLICATIONS

3GPP TSG-RAN WG2 #114, "Discuss on signalling aspects of successful handover report", May 19-27, 2021, R2-2105446 (Year: 2021).*
International Search Report in the international application No. PCT/CN2021/102564, dated Mar. 15, 2022. 5 pages with English translation.

(Continued)

*Primary Examiner* — Siren Wei
(74) *Attorney, Agent, or Firm* — BAYES PLLC

(57) ABSTRACT

Provided are a communication method, a terminal device and a network device. The terminal device receives configuration information sent by a network device, the configuration information being used for indicating one or more conditions for the terminal device to report random access-related information. The terminal device sends a successful handover report that does not contain the random access-related information to the network device in response to a random access of the terminal device not satisfying the one or more conditions for reporting the random access-related information.

17 Claims, 7 Drawing Sheets

(56) References Cited

OTHER PUBLICATIONS

Written Opinion of the International Search Authority in the international application No. PCT/CN2021/102564, dated Mar. 15, 2022. 6 pages with English translation.

3GPP TSG-RAN WG2 #114 electronic R2-2105446, Online, May 19-27, 2021, Source: NEC, Agenda item: 8.13.2.1 Handover related SON aspects, Title: Discuss on signalling aspects of successful handover report, Document for: Discussion and decision. 3 pages.

3GPP TSG-RAN WG2 #114-e Tdoc R2-2106484, Electronic meeting, May 19-27, 2021, Agenda Item: 8.13.2.1, Source: Ericsson, Title: Summary of AI 8.13.2.1 Handover related SON aspects, Document for: Discussion, Decision. 32 pages.

3GPP TSG-RAN WG2 #113-e Tdoc R2-2102265, Electronic meeting, Jan. 25-Feb. 5, 2021, Agenda Item: 8.13.2, Source: Ericsson, Title: Summary of AI 8.13.2, Document for: Discussion, Decision. 41 pages.

3GPP TSG-RAN WG2 Meeting #109-e R2-2002392, Electronic meeting, Feb. 24-Mar. 6, 2020, Title: CR for 38.331 for CA&DC enh, Source to WG: Rapporteur (Ericsson), Source to TSG: RAN2, Work item code: LTE_NR_DC_CA_enh-Core. 111 pages.

3GPP TS 38.331 V16.1.0 (Jul. 2020), 3rd Generation Partnership Project; Technical Specification Group Radio Access Network; NR; Radio Resource Control (RRC) protocol specification (Release 16). 902 pages.

3GPP TS 38.321 V16.0.0 (Mar. 2020), 3rd Generation Partnership Project; Technical Specification Group Radio Access Network; NR; Medium Access Control (MAC) protocol specification, (Release 16). 140 pages.

Ericsson: "[Offline 801] [SON/MDT] Handover related SON aspects (Ericsson)", 3GPP Draft; R2-2106690, BRD Generation Partnership Project (3GPP), Mobilecompetence Centre ; 650, Route Des Lucioles ; F-06921 Sophia-Antipolis Cedex; France vol. Ran WG2, No. Electronic meeting; May 19, 2021-May 27, 2021, May 25, 2021 (May 25, 2021), XP052013869, P. 41, line 10- p. 58, line 22, 62 pages.

Vivo: "Summary of AI 8.13.2.3 Other WID related SON features", 3GPP Draft; R2-2104296, 3rd Generation Partnership Project (3GPP) MoILE Competenece Centre ; 650, Route Des Lucioles ; F-06921 Sophia-Antipolis Cedex; France vol. Ran WG2, No. Electronic meeting; Apr. 12, 2021-Apr. 20, 2021, Apr. 12, 2021 (Apr. 12, 2021), XP051995174, Section 2.1 and related subsections, 21 pages.

Supplementary European Search Report in the European application No. 21946559.8, mailed on Apr. 17, 2024, 11 pages.

* cited by examiner

COMMUNICATION METHOD AND APPARATUS

CROSS-REFERENCE TO RELATED APPLICATION

This application is a continuation of International Patent Application No. PCT/CN2021/102564 filed on Jun. 25, 2021, the disclosure of which is hereby incorporated by reference in its entirety.

BACKGROUND

The 3rd Generation Partnership Project has agreed to introduce a Successful Handover Report (SHR). The successful handover report is intended to further optimize handover experiences of users based on problems found in the successful handover. When a terminal device takes a long time to access a target network, when the terminal device takes a long time to initiate the handover procedure after occurrence of physical layer problems, or when the terminal device receives a handover command over a certain period of time after sending a measurement report, the terminal device will record the successful handover report and report the successful handover report when it is required by the network device.

When the terminal device takes a long time to access a target network, there may be a problem in Random Access Channel (RACH). For example, the quality of downlink measurement beams corresponding to the random access resources for the terminal device is poor, so that the terminal device performs random access only using contention based random access resources. Therefore, random access-related information is added into the successful handover report, which can help the network device optimize the allocation of resources for the random access.

However, in related art, the random access-related information is usually added into the successful handover report by default. When the problems found in successful handover are non-random access problems, it will result in waste of air-interface transmission resources and additional power consumption of the terminal device.

SUMMARY

The disclosure relates to the technical field of communications, and in particular to a communication method and a communication device.

Embodiments of the disclosure provide a communication method and a device to solve the problems of waste of the air-interface transmission resources and additional power consumption of the terminal device due to addition of the random access-related information into all successful handover reports in the prior art.

A first aspect of the present disclosure provides a communication method, and the method includes following operations.

A terminal device receives configuration information sent by a network device, where the configuration information is used for indicating one or more conditions for the terminal device to report random access-related information. In response to a random access of the terminal device not satisfying the one or more conditions for reporting the random access-related information, the terminal device sends a successful handover report that does not contain the random access-related information to the network device.

A second aspect of the present disclosure provides a communication method including following operations.

A network device sends configuration information to a terminal device, where the configuration information is used for indicating one or more conditions for the terminal device to report random access-related information. In response to a random access of the terminal device not satisfying the one or more conditions for reporting the random access-related information, the network device receives a successful handover report that does not contain the random access-related information sent by the terminal device.

A third aspect of the present disclosure provides a terminal device, including a processor, a memory, a receiver and a transmitter. The processor is configured to control the receiver and the transmitter to perform the communication method as described in the first aspect.

A fourth aspect of the present disclosure provides a network device, including a processor, a memory, a receiver and a transmitter. The processor is configured to control the transmitter and the receiver to perform the communication method as described in the second aspect

BRIEF DESCRIPTION OF THE DRAWINGS

In order to more clearly illustrate the technical solutions of the present disclosure or the prior art, a brief description will be given below for the drawings required by the description of the embodiments or the prior art. It will be apparent that the drawings in the following description are some embodiments of the present disclosure, from which other drawings may be obtained without creative effort by a person of ordinary skill in the art.

DETAILED DESCRIPTION

Figure 1:
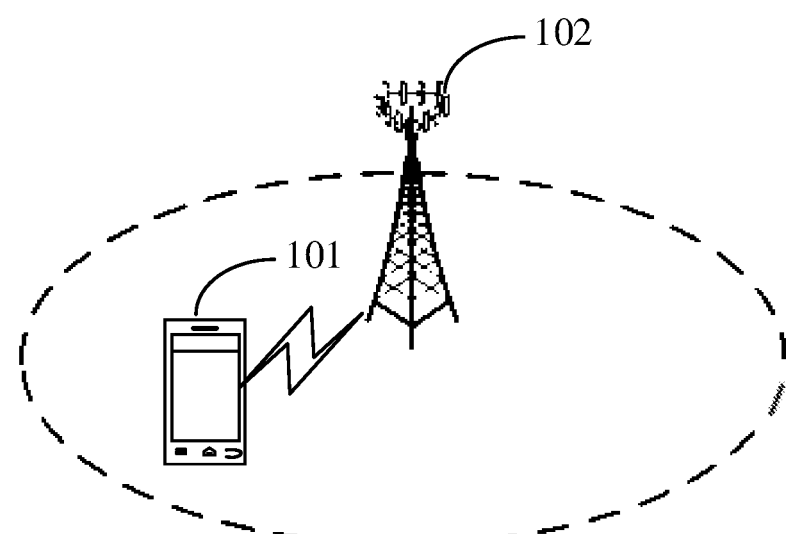
FIG. 1 is a diagram of a scenario to which a communication method is applied according to an embodiment of the present disclosure.

In order to make the objectives, technical solutions and advantages of the embodiments of the present disclosure clearer, technical solutions of the embodiments of the present disclosure will be clearly and completely described below in combination with the accompanying drawings of the embodiments of the present disclosure. It is apparent that the described embodiments are only part, rather than all, of the embodiments of the present disclosure. Based on the embodiments in the present disclosure, all other embodiments acquired by those skilled in the art without involving any inventive effort shall fall within the scope of protection of the present disclosure.

The terms "first", "second", etc. in the specification and claims of the present disclosure and in the above drawings are used for distinguishing similar objects and not necessarily for describing a specific sequence or sequential order. It is to be understood that data used in this way may be interchangeable under an appropriate circumstance, so that the embodiments of the present disclosure described herein are, for example, capable of being implemented in a sequence other than those illustrated or described herein. Furthermore, the terms "include/comprise" and "having", as well as any variations thereof, are intended to cover a non-exclusive inclusion, for example, a process, a method, a system, a product, or a device that includes a series of steps or units is not necessarily limited to contain those expressly listed steps or units, but may contain other steps or units not expressly listed or inherent to such process, method, system, product, or device.

It should be understood that the terms "system" and "network" herein are often used interchangeably herein. In this disclosure, the term "and/or" is only to describe an association relationship between associated objects and represents that three kinds of relationships may exist. For example, A and/or B may represent three conditions: i.e., independent existence of A, existence of both A and B and independent existence of B. In addition, the character "/" in the disclosure generally indicates that the associated objects before and after this character is in an "or" relationship.

The technical solution in the embodiments of the disclosure will be described below in conjunction with the drawings in the embodiments of the disclosure. It is apparent that the described embodiments are a part of the embodiments of the application, not all of the embodiments. Based on the embodiments in the disclosure, all other embodiments obtained by those skilled in the art without creative effort belong to the protection scope of the disclosure.

The successful handover report is described firstly.

During definition of R17 standard, the 3rd Generation Partnership Project has agreed to introduce a Successful Handover Report (SHR). The successful handover report is intended to further optimize handover experiences of users based on problems found in the successful handover. When a terminal device takes a long time to access a target network, when the terminal device takes a long time to initiate the handover procedure after occurrence of physical layer problems, or when the terminal device receives a handover command over a certain period of time after sending a measurement report, the terminal device will record a successful handover report and report the successful handover report when it is required by the network device.

Exemplarily, the terminal device may record a successful handover report when relevant thresholds of a timer T310, timer T312 and timer T304 are exceeded. Table 1 shows conditions for starting, running, and stopping the timer T310, timer T312, and timer T304.

TABLE 1

| | | | |
|---|---|---|---|
| T304 | The timer T304 starts at reception of Radio Resource Control (RRC) Connection Reconfiguration message including the mobility control information message | The timer T304 stops as per criterion for successful completion of handover within 5 G Radio Access Technology (RAT), and handover to 5 G RAT | At expiry, in case of intra 5 G handover, it initiates RRC connection re-establishment procedure. |
| T310 | The timer T310 starts upon detecting physical layer problems for Primary Cell (PCell), i.e., upon receiving N310 consecutive out-of-sync indications from lower layers. | The timer T310 stops upon receiving N311 consecutive in-sync indications from lower layers for PCell; the timer T310 stops upon triggering the handover procedure and upon initiating the connection re-establishment procedure | At expiry, if security is not activated, it goes to RRC_IDLE state. Else, it initiates connection establishment procedure |
| T312 | The timer T312 starts upon triggering a measurement report for measurement identity for which T312 has been configured while T310 timer is running | The timer T312stops upon receiving N311 consecutive in-sync indications from lower layers; the timer T310 stops upon triggering the handover procedure; the timer T310 stops upon the expiry of T310 timer. | At expiry, if security is not activated, go to RRC_IDLE state. ELSE, it initiates the connection re-establishment procedure. |

When the terminal device takes a long time to access a target network, there may be a problem in Random Access Channel (RACH). For example, the quality of downlink measurement beams corresponding to the random access resources for the terminal device is poor, so that the terminal device performs random access only using contention based random access resources. Therefore, random access-related information is added into the successful handover report, which can help the network device optimize the allocation of resources for the random access.

Several possible reasons why the terminal device takes a long time to access the target network are provided exemplarily below.

Exemplarily, when the terminal device is performing contention based random access (CBRA), if the transmission of message 3 (msg3) encounters multiple contentions, the delay of the random access procedure is prolonged.

Exemplarily, when the terminal device applies a contention free random access (CFRA), but the network device does not perceive the transmission of message 1 (msg1) since the transmission energy of the msg1 is small. As a result, the terminal device needs to fall back and increase the energy for retransmission of preamble(s). In this case, a duration of the random access procedure may also be prolonged.

Exemplarily, in a two-step random access procedure, if the terminal device hasn't successfully got access to the network when the times of transmission of a message A (msgA) reaches a specified number, then the terminal device also needs to fall back to a four-step random access, which prolongs the delay of the random access. In addition, if the network device is unable to decode a payload of a Physical Uplink Shared Channel (PUSCH) after the terminal device sends the msgA, then the terminal device will send a Random Access Response (RAR) for a fallback indication to the terminal device, and the terminal device then sends the msg3 to the network, thus the overall duration is prolonged.

However, in related art, the random access-related information is usually added into the successful handover report by default. When the problems found in successful handover are non-random access problems, it will result in waste of air-interface transmission resources and additional power consumption of the terminal device.

In order to solve the above problems, the embodiments of the disclosure provide a communication method and a communication device. Only when the condition(s) for the terminal device to report the random access-related information are satisfied, the terminal device will add the random access-related information into the successful handover report, thereby avoiding the waste of air-interface transmission resources and additional power consumption of the terminal device due to addition of the random access-related information into all successful handover reports in the prior art.

It should be noted that the technical solutions provided by the embodiments of the disclosure may be applied to various communication systems, such as, a global system of mobile communication (GSM) system, a code division multiple access (CDMA) system, a wideband code division multiple access (WCDMA) system, a general packet radio service (GPRS), a LTE system, a LTE frequency division duplex (FDD) system, a LTE time division duplex (TDD) system, an advanced long term evolution (LTE-A) system, a new radio (NR) system, an evolution system of NR system, a LTE-based access to unlicensed spectrum, LTE-U) system, a NR-based access to unlicensed spectrum (NR-U) system, an universal mobile telecommunications system (UMTS), a world interoperability for microwave access (WiMAX) communication system, a wireless local area network (WLAN), a wireless fidelity (WiFi), a next generation communication system or other communication systems.

The following provides examples for illustration of the applied scenarios of the disclosure.

FIG. 1 is a diagram of a scenario to which a communication method is applied according to an embodiment of the present disclosure. As shown in FIG. 1, a network device 102 may send to a terminal device 101 configuration information for indicating one or more conditions for the terminal device 101 to report random access-related information. Optionally, the one or more conditions for reporting the random access-related information may be stored inherently by the terminal device 101, rather than being configured by the network device 102. When the terminal device 101 records a successful handover report, the terminal device 101 may determine whether to add the one or more conditions for reporting the random access-related information into the successful handover report according to the configuration information. In response to a random access of the terminal device not satisfying the one or more conditions for reporting the random access-related information, the terminal device 101 sends a successful handover report that does not contain the random access-related information to the network device 102. In response to the random access of the terminal device satisfying at least one of the one or more conditions for reporting the random access-related information, the terminal device 101 sends a successful handover report containing the random access-related information to the network device 102. Subsequently, in response to the successful handover report containing the random access-related information, the network device 102 may reconfigure a resource for the random access according to the random access-related information.

The terminal device 101 includes, but is not limited to, satellites or cellular phones; personal communications system (PCS) terminals that may combine a cellular radiotelephony with data processing, fax, and data communication capabilities; PDAs that may include radiophones, pagers, Internet/intranet access, web browsers, notebooks, calendars, and/or global positioning system (GPS) receivers; and conventional laptop and/or handheld receivers or other electronic devices including radiophone transceivers. The terminal device may be an access terminal, user equipment (UE), a user unit, a user station, a mobile station, a mobile site, a remote station, a remote terminal, a mobile device, a user terminal, a terminal, a wireless communication device, a user agent or a user device. The access terminal may be a cellular telephone, a cordless telephone, a session initiation protocol (SIP) telephone, a wireless local loop (WLL) station, a personal digital Assistant (PDA), a handheld device with wireless communication function, a computing device or another processing device connected to a wireless modem, an on-board device, a wearable device, a terminal in 5G network or a terminal device in a future evolved PLMN, etc.

The network device 102 may provide communication coverage for a particular geographic area and may communicate with terminal devices located within the coverage. Optionally, the network device 110 may be a base transceiver station (BTS) in a GSM system or a CDMA system, a base station (NodeB, or NB) in a WCDMA system, or an evolved base station (Node B, eNB or eNodeB) in an LTE system, or a wireless controller in a cloud radio access network (CRAN). Optionally, the network device may be a mobile switching center, a relay station, an access point, a vehicle-mounted device, a wearable device, a hub, a switch, a bridge, a router, a network device in a 5G network, or a network device in a future evolved public land mobile network (PLMN), etc.

Taking the terminal device and the network device as examples, the technical solutions of the embodiments of the present disclosure will be described in detail with specific embodiments. The following specific embodiments may be combined with one another and the same or similar concepts or processes may not be repeated in some embodiments.

Figure 2:
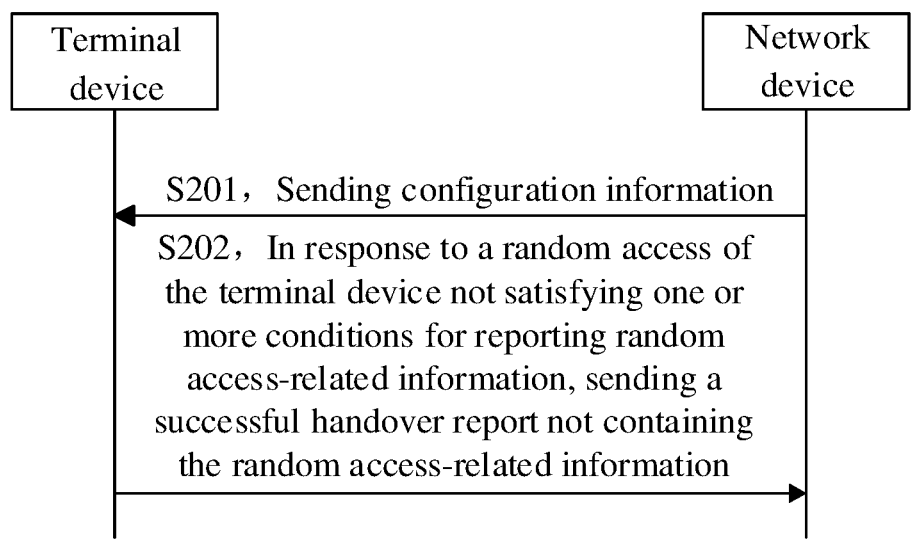
FIG. 2 is a signaling interaction diagram of a communication method according to an embodiment of the present disclosure.

FIG. 2 is a signaling interaction diagram of a communication method according to an embodiment of the present disclosure. The embodiment of the disclosure uses a terminal device and a network device as executive entities, and involves a specific procedure of how the terminal device sends a successful handover report to the network device. As shown in FIG. 2, the method includes operations S201 and S202.

In operation S201, the network device sends configuration information to the terminal device. The configuration information is used for indicating one or more conditions for the terminal device to report random access-related information.

In the present disclosure, the network device may send the configuration information to the terminal device in advance to indicate the one or more conditions for the terminal device to report random access-related information, so that the terminal device may determine whether to add the random access-related information into a successful handover report according to the one or more conditions for the terminal device to report the random access-related information when the successful access report is triggered.

The random access-related information is used for representing a situation of a random access of the terminal device. The specific content of the random access-related information is not limited in the embodiments of the present disclosure, and may be specifically set according to actual requirements. For example, the specific content of the random access-related information may include the quality of the downlink measurement beams corresponding to the random access resource, the types of the random access, etc.

It should be understood that how the network device sends configuration information to the terminal device is not limited in the embodiments of the present disclosure. In some embodiments, the configuration information may be carried in a Radio Resource Control (RRC) signaling.

In some embodiments, the one or more conditions for the terminal device to report the random access-related information are specifically used for determining whether the random access of the terminal device is abnormal. Several conditions for the terminal devices to report the random access-related information are exemplarily described below.

In a first case, the one or more conditions for the terminal device to report the random access-related information may include that: a duration for the terminal device to access a target network exceeds a duration threshold.

For example, the duration for the terminal device to access the target network may be determined through a timer T304. If a timing duration of the timer T304 exceeds the duration threshold, it may be determined that a duration for the random access of the terminal device is too long, and the random access of the terminal device satisfies the conditions for reporting the random access-related information.

The duration threshold may be a customized value or a fixed value. Exemplarily, the duration threshold is a pre-configured value for the terminal device, or is configured according to a signaling or a broadcast sent by the network device.

In a second case, the one or more conditions for the terminal device to report the random access-related information further include that: a delay of a procedure of the random access of the terminal device exceeds a delay threshold. In the embodiments of the present disclosure, a start time and the ending time of the procedure of the random access are not limited. Exemplarily, the start time of the procedure of the random access is a time when the terminal device receives a signaling containing mobility control information or when the terminal device sends msg1 for the random access, and the ending time of the procedure of the random access is a time when the terminal device successfully completes the random access.

The delay threshold is a customized value or a fixed value. Exemplarily, the delay threshold is a pre-configured value for the terminal device, or is configured according to a signaling or a broadcast sent by the network device.

In a third case, the one or more conditions for the terminal device to report the random access-related information further include that: a downlink measurement result for a synchronization signal block (SSB) or a Channel State Information Reference Signal (CSI-RS) corresponding to a dedicated random access resource configured by the network device for the terminal device does not satisfy a preset requirement.

It should be understood that the setting of the preset requirement is not limited in the embodiments of the present disclosure. In some embodiments, it may be determined that the preset requirement is not satisfied when a value of the CSI-RS is less than a threshold of the CSI-RS (i.e., CSI-RSRP≤rsrp-ThresholdCSI-RS) or when a value of the SSB is less than the threshold of the SSB (i.e., SS-RSRP≤rsrp-ThresholdSSB).

In other embodiments, during a successful random access procedure, when the terminal device selects the random access resources, if the number of times that the value of the CSI-RS is less than the threshold of the CSI-RS is greater than a first number threshold or 0, or a number of times that the value of the SSB is less than the threshold of the SSB is greater than the first number threshold or 0, it is determined that the preset requirement is not satisfied.

The first number threshold may be a customized value or a fixed value. Exemplarily, the first number threshold is a pre-configured value for the terminal device, or is configured according to a signaling or a broadcast sent by the network device.

In a fourth case, the one or more conditions for the terminal device to report the random access-related information further include that: the terminal device performs a contention based random access and contention resolution is successful, or the terminal device performs the contention based random access and a number of times that contention resolution is not successful is greater than a second number threshold.

The second number threshold may be a customized value or a fixed value. Exemplarily, the second number threshold is a pre-configured value for the terminal device or is configured according to a signaling or a broadcast sent by the network device.

In a fifth case, the one or more conditions for the terminal device to report the random access-related information further include that: the terminal device performs a contention based random access but a number of times that the terminal device does not obtain a synchronization signal block (SSB) having a value greater than a pre-configured threshold (represented as RSRP-ThresholdSSB) is greater than or equal to a third number threshold.

The third number threshold may be a customized value or a fixed value. Exemplarily, the third number threshold is a pre-configured value for the terminal device, or is configured according to a signaling or a broadcast sent by the network device.

In a sixth case, the one or more conditions for reporting the random access-related information further include that: the terminal device falls back to a four-step random access when performing a two-step random access, or a number of times that the terminal device falls back to the four-step random access is greater than a fourth number threshold. The terminal device falls back to the four-step random access because a payload of the physical uplink shared channel was not successfully decoded by the network device.

The fourth number threshold may be a customized value or a fixed value. Exemplarily, the fourth number threshold is a pre-configured value for the terminal device, or is configured according to a signaling or a broadcast sent by the network device.

In a seventh case, the one or more conditions for reporting the random access-related information further include that:

the terminal device performs a two-step random access and a number of times that the terminal device sends message A (msgA) is greater than a fifth number threshold, or the terminal device switches back to the two-step random access during performing the random access.

The fifth number threshold may be a customized value or a fixed value. Exemplarily, the fifth number threshold is a pre-configured value for the terminal device, or is configured according to a signaling or a broadcast sent by the network device.

It should be understood that the number of conditions for reporting the random access-related information indicated in the configuration information is not limited in the embodiments of the present disclosure. There may be one of the cases above or there may be multiple among the cases above. In an embodiment of the present disclosure, if the random access of the terminal device satisfies at least one of the one or more conditions for the terminal device to report the random access-related information, the random access-related information may be added into the successful handover report.

In operation S202, in response to a random access of the terminal device not satisfying the one or more conditions for reporting the random access-related information, the terminal device sends a successful handover report that does not contain the random access-related information to the network device.

In this operation, after the terminal device receives the configuration information sent by the network device, if the random access of the terminal device does not satisfy the one or more conditions for reporting the random access-related information, the terminal device sends the successful handover report that does not contain the random access-related information to the network device.

In other embodiments, in response to the random access of the terminal device satisfying at least one of the one or more conditions for reporting the random access-related information, the terminal device sends a successful handover report containing the random access-related information to the network device.

It should be noted that how to add the random access-related information into the successful handover report is not limited in the embodiments of the present disclosure, which may be specifically set according to the actual situations.

In some embodiments, if the successful handover report contains the random access-related information, the network device may reconfigure a resource for the random access based on the random access-related information in the successful handover report. Exemplarily, the network device may reconfigure the SSB(s) or CSI-RS(s) associated with the random access resource.

In the communication method provided by the embodiments of the present disclosure, the terminal device receives the configuration information sent by the network device, the configuration information being used for indicating the one or more conditions for the terminal device to report the random access-related information. If the random access of the terminal device does not satisfy the one or more conditions for reporting the random access-related information, the terminal device sends the successful handover report that does not contain the random access-related information to the network device. In this way, only when the one or more conditions for the terminal device to report the random access-related information are satisfied, the terminal device will add the random access-related information into the successful handover report, thereby avoiding waste of the air-interface transmission resources and additional power consumption of the terminal device due to addition of the random access-related information into all successful handover reports in the prior art.

Figure 3:
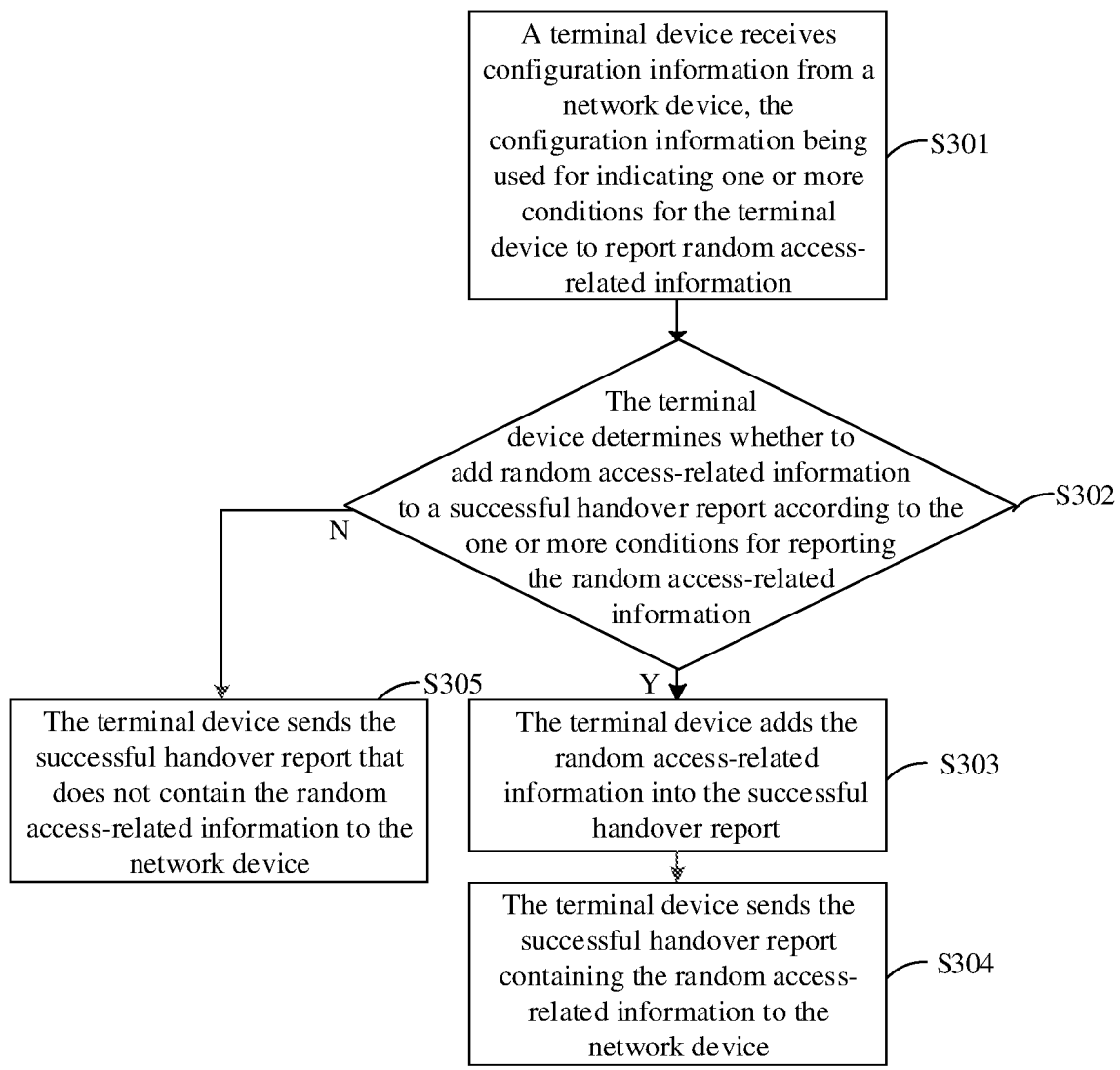
FIG. 3 is a signaling interaction diagram of another communication method according to an embodiment of the present disclosure.

Based on the above embodiments, a complete process of a terminal device sending a successful handover report to a network device is provided below. FIG. 3 is a signaling interaction diagram of another communication method according to an embodiment of the present disclosure. The embodiment of the disclosure uses the terminal device and the network device as executive entities, and involves a specific procedure of how the terminal device sends a successful handover report to the network device. As shown in FIG. 3, the method includes operations S301, S302, S303, S304 and S305.

In operation S301, the terminal device receives configuration information sent by the network device, the configuration information being used for indicating one or more conditions for the terminal device to report random access-related information.

In operation S302, the terminal device determines whether to add the random access-related information into a successful handover report according to the one or more conditions for reporting the random access-related information.

If it is determined to add the random access-related information into the successful handover report, the operation S303 is performed. If it is determined not to add the random access-related information into the successful handover report, the operation S305 is performed.

In an embodiment of the present disclosure, in response to the random access of the terminal device not satisfying the one or more conditions for reporting the random access-related information, the terminal device determines not to add the random access-related information into the successful handover report. In response to the random access of the terminal device satisfying the one or more conditions for reporting the random access-related information, the terminal device determines to add the random access-related information into the successful handover report.

In operation S303, the terminal device adds the random access-related information into the successful handover report.

In operation S304, the terminal device sends the successful handover report containing the random access-related information to the network device.

In operation S305, the terminal device sends the successful handover report that does not contain the random access-related information to the network device.

The technical terms, technical effects, technical features and optional implementations in operations S301-S305 may be understood with reference to operations S201-S202 shown in FIG. 2, and the repeated contents will not be elaborated here.

Figure 4:
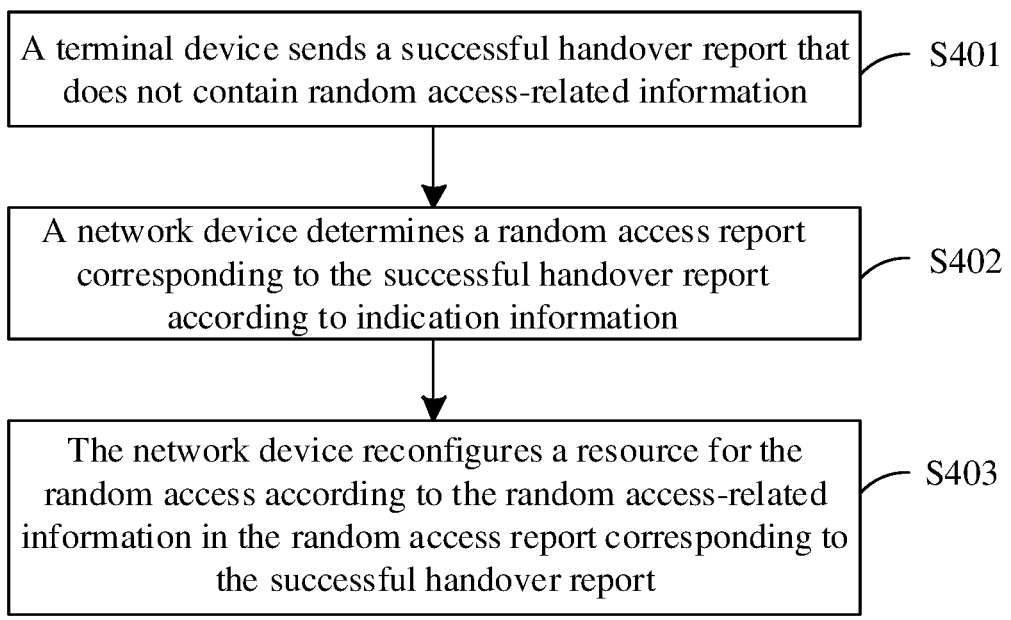
FIG. 4 is a signaling interaction diagram of yet another communication method according to an embodiment of the present disclosure.

A manner in which a terminal device sends a successful handover report to a network device provided in another aspect will be described below. FIG. 4 is a signaling interaction diagram of another communication method according to an embodiment of the present disclosure. The embodiment of the disclosure uses the terminal device and the network device as executive entities, and involves a specific procedure of how the terminal device sends a successful handover report to the network device. As shown in FIG. 4, the method includes operations S401, S402, S403.

In operation S401, the terminal device sends a successful handover report that does not contain random access-related information. The successful handover report contains indication information for indicating a random access report corresponding to the successful handover report, and the random access report contains the random access-related information.

In the embodiment, since the random access report contains the random access-related information, the terminal device may establish a correspondence between the random access report(s) and the successful handover report(s), so that the terminal device may not add the random access-related information into all the successful handover reports, and the network device may find the random access-related information from the random access report corresponding to the successful handover report.

It should be understood that how to establish the correspondence between the random access report(s) and the successful handover report(s) is not limited in the embodiments of the present disclosure. In some embodiments, the correspondence between the random access report(s) and the successful handover report(s) may be established by adding indication information.

In some embodiments, the indication information may include a timestamp. The timestamp in the successful handover report is configured to match with a timestamp in the random access report to determine the random access report corresponding to the successful handover report.

Exemplarily, timestamps may be added into both the successful handover report and the random access report. When a timestamp in a successful handover report matches with a timestamp in a random access report, it may be determined that the successful handover report corresponds to the random access report, and the network device may provide the random access-related information in the random access report as the random access-related information corresponding to the successful handover report.

It should be noted that the time recorded by the timestamp is not limited in the embodiments of the present disclosure. For example, the timestamp may be used for recording a time when the random access is started and a time when a handover is started, or the timestamp is used for recording a time when the random access is started and a time when a handover command is received.

In other embodiments, the indication information may also include index information of the random access report in a random access report list. By adding the index information of the random access report in a random access report list in the successful handover report, the network device may quickly determine the random access report corresponding to the successful handover report, and then obtain the random access-related information corresponding to the successful handover report.

Optionally, the terminal device may also select to add the indication information for a successful handover report in a random access report to indicate the successful handover report corresponding to the random access report.

In operation S402, the network device determines the random access report corresponding to the successful handover report according to the indication information.

In operation S403, the network device reconfigures a resource for the random access according to the random access-related information in the random access report corresponding to the successful handover report.

According to the communication method and communication device provided by the embodiments of the disclosure, the terminal device receives the configuration information sent by the network device, and the configuration information is used for indicating one or more conditions for the terminal device to report random access-related information. In response to a random access of the terminal device not satisfying the one or more conditions for reporting the random access-related information, the terminal device sends a successful handover report that does not contain the random access-related information to the network device. In this way, only when the conditions for the terminal device to report the random access-related information are satisfied, the terminal device will add the random access-related information into the successful handover report, thereby avoiding the waste of the air-interface transmission resources and additional power consumption of the terminal device due to addition of the random access-related information into all successful handover reports in the prior art.

Those of ordinary skill in the art will appreciate that all or part of the operations of implementing the above method embodiments may be accomplished by hardware related to program information, and the aforementioned program may be stored in a computer-readable storage medium. When the program is executed, the operations including the above method embodiments are performed. The aforementioned storage medium includes various medium capable of storing program codes, such as Read-Only Memory (ROM), Random Access Memory (RAM), magnetic disk or optical disk.

Figure 5:
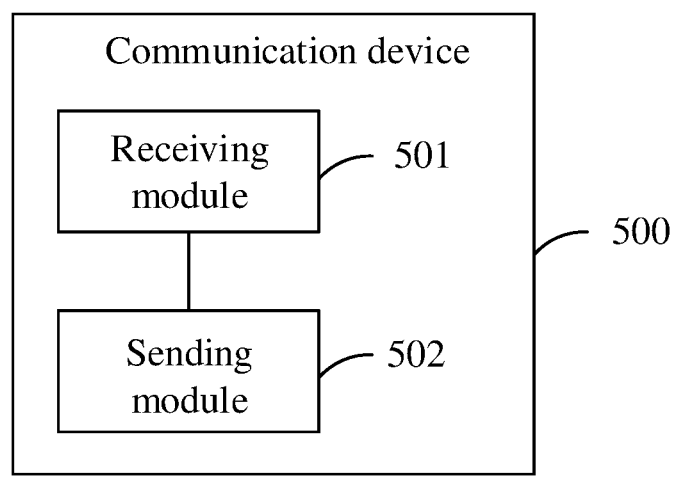
FIG. 5 is a schematic structural diagram of a communication device according to an embodiment of the present disclosure.

FIG. 5 is a schematic structural diagram of a communication device according to an embodiment of the present disclosure. The communication device may be implemented by software, hardware, or a combination thereof, to perform the communication method at the terminal device side in the above-described embodiments. As shown in FIG. 5, the communication device 500 includes a receiving module 501 and a sending module 502.

The receiving module 501 is configured to receive configuration information sent by a network device, where the configuration information is used for indicating one or more conditions for the communication device to report random access-related information.

The sending module 502 is configured to send a successful handover report that does not contain the random access-related information to the network device in response to a random access of the communication device not satisfying the one or more conditions for reporting the random access-related information.

In an optional implementation, the sending module 502 is further configured to send a successful handover report containing the random access-related information to the network device, in response to the random access of the communication device satisfying at least one of the one or more conditions for reporting the random access-related information.

In an optional implementation, the one or more conditions for the communication device to report the random access-related information include that: a duration for the communication device to access a target network exceeds a duration threshold.

In an optional implementation, the duration threshold is a pre-configured value for the communication device, or is configured according to a signaling or a broadcast sent by the network device.

In an optional implementation, the one or more conditions for the communication device to report the random access-related information further include that: a delay of a procedure of the random access of the communication device exceeds a delay threshold.

In an optional implementation, the delay threshold is a pre-configured value for the communication device, or is configured according to a signaling or a broadcast sent by the network device.

In an optional implementation, a start time of the procedure of the random access is a time when the communication device receives a signaling containing mobility control information or when the communication device sends a message 1 for the random access, and an ending time of the procedure of the random access is a time when the communication device successfully completes the random access.

In an optional implementation, the one or more conditions for the communication device to report the random access-related information further include that: a downlink measurement result for a synchronization signal block (SSB) or a channel state information reference signal (CSI-RS) corresponding to a dedicated random access resource configured by the network device for the communication device does not satisfy a preset requirement.

In an optional embodiment, the condition that the downlink measurement result for the SSB or the CSI-RS does not satisfy the preset requirement is determined according to whether a number of times that a value of the CSI-RS is less than a threshold of the CSI-RS is greater than a first number threshold or 0, or according to whether a number of times that a value of the SSB is less than a threshold of the SSB is greater than the first number threshold or 0.

In an optional implementation, the first number threshold is a pre-configured value for the communication device, or is configured according to a signaling or a broadcast sent by the network device.

In an optional embodiment, the one or more conditions for the communication device to report the random access-related information further include that: the communication device performs a contention based random access and contention resolution is successful, or the communication device performs the contention based random access and a number of times that the contention resolution is not successful is greater than a second number threshold.

In an optional implementation, the second number threshold is a pre-configured value for the communication device or is configured according to a signaling or a broadcast sent by the network device.

In an optional implementation, the one or more conditions for the communication device to report the random access-related information further include that: the communication device performs a contention based random access but a number of times that the communication device does not obtain a synchronization signal block (SSB) having a value greater than a pre-configured threshold is greater than or equal to a third number threshold.

In an optional implementation, the third number threshold is a pre-configured value for the communication device, or is configured according to a signaling or a broadcast sent by the network device.

In an optional embodiment, the one or more conditions for reporting the random access-related information further include that: the communication device falls back to a four-step random access when performing a two-step random access, or a number of times that the communication device falls back to the four-step random access is greater than a fourth number threshold. The communication device falls back to the four-step random access because a payload of the physical uplink shared channel was not successfully decoded by the network device.

In an optional implementation, the fourth number threshold is a pre-configured value for the communication device, or is configured according to a signaling or a broadcast sent by the network device.

In an optional implementation, the one or more conditions for reporting the random access-related information further include that: the communication device performs a two-step random access and a number of times that the communication device sends message A is greater than a fifth number threshold, or the communication device switches back to the two-step random access during performing the random access.

The communication device provided in the embodiments of the present disclosure may perform the operations of the communication method at the terminal device side in the above embodiments, and the implementation principle and technical effect of the communication device are similar to that of the terminal device, which will not be elaborated herein.

Figure 6:
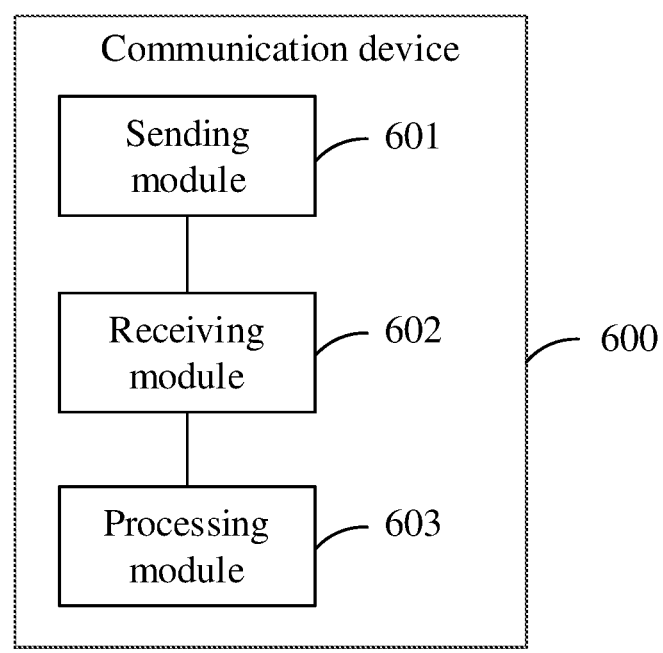
FIG. 6 is a schematic structural diagram of another communication device according to an embodiment of the present disclosure.

FIG. 6 is a schematic structural diagram of another communication device according to an embodiment of the present disclosure. The communication device may be implemented by software, hardware, or a combination thereof, to perform the communication method at the network device side in the above-described embodiments. As shown in FIG. 6, the communication device 600 includes a sending module 601, a receiving module 602 and a processing module 603.

The sending module 601 is configured to send configuration information to a terminal device, where the configuration information is used for indicating one or more conditions for the terminal device to report random access-related information.

The receiving module 602 is configured to receive a successful handover report that does not contain the random access-related information sent by the terminal device in response to a random access of the terminal device not satisfying the one or more conditions for reporting the random access-related information.

In an optional embodiment, the receiving module 602 is further configured to receive a successful handover report containing the random access-related information sent by the terminal device, in response to the random access of the terminal device satisfying at least one of the one or more conditions for reporting the random access-related information.

In an optional implementation, the one or more conditions for the terminal device to report the random access-related information include that: a duration for the terminal device to access a target network exceeds a duration threshold.

In an optional implementation, the duration threshold is a pre-configured value for the terminal device, or is configured according to a signaling or a broadcast sent by the communicating device.

In an optional implementation, the one or more conditions for the terminal device to report the random access-related information further include that: a delay of a procedure of the random access of the terminal device exceeds a delay threshold.

In an optional implementation, the delay threshold is a pre-configured value for the terminal device, or is configured according to a signaling or a broadcast sent by the communicating device.

In an optional implementation, a start time of the procedure of the random access is a time when the terminal device receives a signaling containing mobility control information or when the terminal device sends a message 1 (msg1) for the random access, and an ending time of the procedure of the random access is a time when the terminal device successfully completes the random access.

In an optional implementation, the one or more conditions for the terminal device to report the random access-related information further include that: a downlink measurement result for a synchronization signal block (SSB) or a channel state information reference signal (CSI-RS) corresponding to a dedicated random access resource configured by the communicating device for the terminal device does not satisfy a preset requirement.

In an optional embodiment, the condition that the downlink measurement result for the SSB or the CSI-RS does not satisfy the preset requirement is determined according to whether a number of times that a value of the CSI-RS is less than a threshold of the CSI-RS is greater than a first number threshold or 0, or according to whether a number of times that a value of the SSB is less than a threshold of the SSB is greater than the first number threshold or 0.

In an optional implementation, the first number threshold is a pre-configured value for the terminal device, or is configured according to a signaling or a broadcast sent by the communication device.

In an optional embodiment, the one or more conditions for the terminal device to report the random access-related information further include that: the terminal device performs a contention based random access and contention resolution is successful, or the terminal device performs the contention based random access and a number of times that the contention resolution is not successful is greater than a second number threshold.

In an optional implementation, the second number threshold is a pre-configured value for the terminal device or is configured according to a signaling or a broadcast sent by the communication device.

In an optional implementation, the one or more conditions for the terminal device to report the random access-related information further include that: the terminal device performs a contention based random access but a number of times that the terminal device does not obtain a synchronization signal block (SSB) having a value greater than a pre-configured threshold is greater than or equal to a third number threshold.

In an optional implementation, the third number threshold is a pre-configured value for the terminal device, or is configured according to a signaling or a broadcast sent by the communication device.

In an optional implementation, the one or more conditions for reporting the random access-related information further include that: the terminal device falls back to a four-step random access when performing a two-step random access, or a number of times that the terminal device falls back to the four-step random access is greater than a fourth number threshold, where the reason why the terminal device falls back to the four-step random access is that a payload of the physical uplink shared channel (PUSCH) was not successfully decoded by the communication device.

In an optional implementation, the fourth number threshold is a pre-configured value for the terminal device, or is configured according to a signaling or a broadcast sent by the communication device.

In an optional embodiment, the one or more conditions for reporting the random access-related information further include that: the terminal device performs a two-step random access and a number of times that the terminal device sends message A is greater than a fifth number threshold, or the terminal device switches back to the two-step random access during performing the random access.

In an optional implementation, the device further includes a processing module 603.

The processing module 603 is configured to reconfigure a resource for the random access according to the random access-related information in the successful handover report.

The communication device provided in the embodiments of the present disclosure may perform the operations of the communication method at the network device side in the above embodiments, and the implementation realization principle and technical effect of the communication device are similar to the network device, which will not be elaborated herein.

Embodiments of the disclosure also provide a communication device, including a sending module.

The sending module is configured to send a successful handover report that does not contain random access-related information. The successful handover report contains indication information for indicating a random access report corresponding to the successful handover report, and the random access report contains the random access-related information.

In an optional implementation, the indication information includes a timestamp; and the timestamp in the successful handover report is configured to match with a timestamp in the random access report to determine the random access report corresponding to the successful handover report.

In an optional implementation, the timestamp is used for recording a time when the random access is started and a time when a handover is started, or the timestamp is used for recording a time when the random access is started and a time when a handover command is received.

In an optional implementation, the indication information includes index information of the random access report in a random access report list.

The communication device provided in the embodiments of the present disclosure may perform the operations of the communication method at the terminal device side in the above embodiments, and the implementation principle and technical effect of the communication device are similar to that of the terminal device, which will not be elaborated herein.

Embodiments of the disclosure also provide a communication device, including a receiving module.

The receiving module is configured to receive a successful handover report that does not contain random access-related information sent by a terminal device. The successful handover report contains indication information for indicating a random access report corresponding to the successful handover report, and the random access report contains the random access-related information.

In an optional implementation, the indication information includes a timestamp; and the timestamp in the successful handover report is configured to match with a timestamp in the random access report to determine the random access report corresponding to the successful handover report.

In an optional implementation, the timestamp is used for recording a time when the random access is started and a time when a handover is started, or the timestamp is used for recording a time when the random access is started and a time when a handover command is received.

In an optional implementation, the indication information includes index information of the random access report in a random access report list.

In an optional implementation, the device further includes a processing module.

The processing module is configured to determine random access-related information corresponding to the successful handover report from the random access report according to the indication information; and reconfigure a resource for the random access according to the random access-related information corresponding to the successful handover report.

The communication device provided in the embodiments of the present disclosure may perform the operations of the communication method at the network device side in the above embodiments, and the implementation principle and technical effect of the communication device are similar to that of the network device, which will not be elaborated herein.

Figure 7:
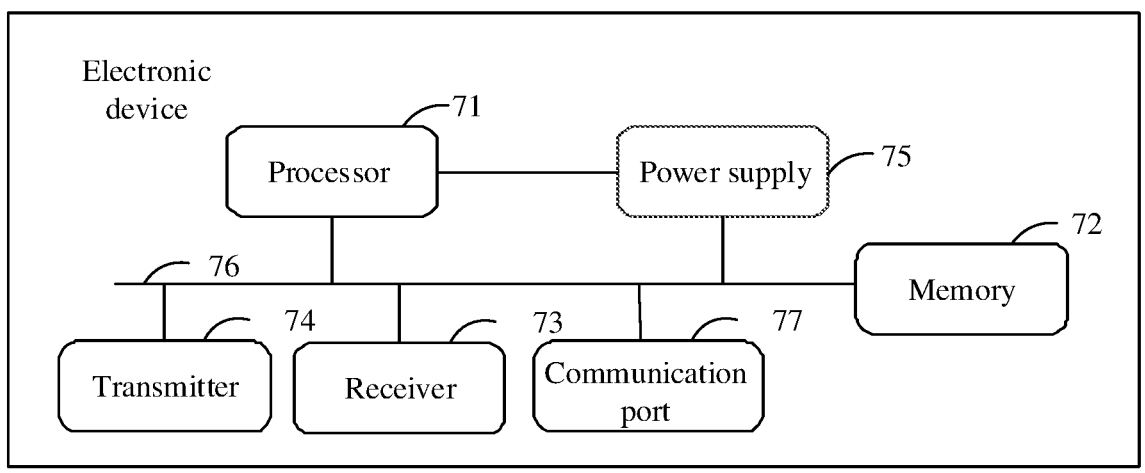
FIG. 7 is a schematic structural diagram of an electronic device according to an embodiment of the present disclosure.

FIG. 7 is a schematic structural diagram of an electronic device according to an embodiment of the present disclosure. As shown in FIG. 7, the electronic device may include a processor 71 (e.g. CPU), a memory 72, a receiver 73 and a transmitter 74. The receiver 73 and the transmitter 74 are coupled to the processor 71. The processor 71 controls receiving operations of the receiver 73 and sending operations of the transmitter 74. The memory 72 may include high-speed RAM memory and may also include non-volatile memory (NVM), such as at least one disk memory. The memory 72 may store various information to implement various processing functions and the method operations of the embodiments of the present disclosure. Optionally, the electronic device according to the embodiment of the present disclosure may further include: a power supply 75, a communication bus 76, and a communication port 77. The receiver 73 and the transmitter 74 may be integrated in the transceiver of the electronic device or may be separate transceiver antennas on the electronic device. The communication bus 76 is configured to implement the communication connection between the elements. The communication port 77 is configured to implement communication connections between the electronic device and other peripheral devices.

In an embodiment of the present disclosure, the memory 72 is configured to store computer executable program code including information. When the processor 71 executes the information, the information causes the processor 71 to perform the processing operations at the terminal device side in the above-mentioned method embodiments, causes the transmitter 74 to perform the sending operations at the terminal device side in the above-mentioned method embodiments, and causes the receiver 73 to perform the receiving operations at the terminal device side in the above-mentioned method embodiments; and the implementation principle and technical effect thereof are similar to that of the terminal device, which will not be elaborated herein.

Optionally, when the processor 71 executes the information, the information causes the processor 71 to perform the processing operations at the network device side in the above-mentioned method embodiments, causes the transmitter 74 to perform the sending operations at the network device side in the above-mentioned method embodiments, and causes the receiver 73 to perform the receiving operations at the network device side in the above-mentioned method embodiments; and the implementation principle and technical effect thereof are similar to that of the terminal device, which will not be elaborated herein.

Embodiments of the disclosure also provide a communication system, including a terminal device and a network device to perform the communication method above.

Embodiments of the disclosure also provide a chip, including a processor and an interface. The interface is configured to input and output data or instructions processed by the processor. The processor is configured to perform the method provided in the above method embodiments. The chip may be applied to the terminal device or network device.

The disclosure also provides a computer-readable storage medium, which may include a U disk, a mobile hard disk, a ROM, a RAM, a magnetic disk or an optical disk and other medium capable of storing program codes. In particular, the computer-readable storage medium stores program information used for the communication method.

Embodiments of the disclosure also provide a program that, when executed by a processor, causes the processor to perform the communication method provided by the above method embodiments.

Embodiments of the disclosure also provide a program product, such as a computer-readable storage medium, having stored thereon instructions that, when running on a computer, causes the computer to perform the communication method provided by the above method embodiments.

The above-described embodiments may be implemented in whole or in part by software, hardware, firmware or any combination thereof. When implemented in software, they may be implemented in whole or in part in the form of a computer program product. The computer program product includes one or more computer instructions. When the computer program instructions are loaded and executed on a computer, the flows or functions according to the embodiments of the disclosure is generated in whole or in part. The computer may be a general purpose computer, a special purpose computer, a computer network, or other programmable devices. The computer instructions may be stored in or transmitted from one computer-readable storage medium to another. For example, the computer instructions may be transmitted from one Web site, computer, server, or data center to another Web site, computer, server, or data center in a wired (e.g. coaxial cable, optical fiber, digital subscriber line (DSL)) manner or wireless (e.g. infrared, wireless, microwave, etc.) manner. The computer-readable storage medium may be any available medium that a computer may access or a data storage device such as a server, a data center, or the like that contains one or more integrations of available medium. The available medium may be magnetic medium (e.g. floppy disk, hard disk, magnetic tape), optical medium (e.g. DVD), or semiconductor medium (e.g. Solid State Disk (SSD)), etc.

Finally, it should be noted that the above embodiments are only used for illustrating, but not to limit to, the technical solutions of the present disclosure. Although the present disclosure has been described in detail with reference to the foregoing embodiments, it should be understood by those of ordinary skill in the art that the technical solutions described in the foregoing embodiments may still be modified or some or all of the technical features thereof may be equivalently replaced. These modifications or replacements do not depart the essence of the corresponding technical solutions from the scope of the technical solutions of the embodiments of the present disclosure.

The invention claimed is:

1. A method of wireless communication, comprising:
receiving, by a terminal device, configuration information sent by a network device, the configuration information being used to indicate one or more conditions for reporting random access-related information to the network device; and
in response to a random access of the terminal device not satisfying the one or more conditions for reporting the random access-related information, sending, by the terminal device, a successful handover report that does not contain the random access-related information to the network device,
wherein the one or more conditions for the terminal device to report the random access-related information further includes that a delay of a procedure of the random access of the terminal device exceeds a delay threshold.

2. The method of claim 1, further comprising:
in response to the random access of the terminal device satisfying at least one of the one or more conditions for reporting the random access-related information, sending, by the terminal device, a successful handover report containing the random access-related information to the network device.

3. The method of claim 1, wherein the one or more conditions for the terminal device to report the random access-related information includes that a duration for the terminal device to access a target network exceeds a duration threshold.

4. The method of claim 3, wherein:
the duration threshold is a pre-configured value for the terminal device, or
the duration threshold is configured according to a signaling or a broadcast sent by the network device.

5. The method of claim 1, wherein:
the delay threshold is a pre-configured value for the terminal device, or
the delay threshold is configured according to a signaling or a broadcast sent by the network device.

6. The method of claim 1, wherein:
a start time of the procedure of the random access is a time when the terminal device receives a signaling containing mobility control information or when the terminal device sends a message 1 for the random access, and
an ending time of the procedure of the random access is a time when the terminal device successfully completes the random access.

7. A terminal device, comprising:
a processor; and
memory storing instructions, which when executed by a processor, cause the processor to:
receive configuration information sent by a network device, the configuration information being used to indicate one or more conditions for the terminal device to report random access-related information; and
send a successful handover report that does not contain the random access-related information to the network device in response to a random access of the terminal device not satisfying the one or more conditions for reporting the random access-related information,
wherein the one or more conditions for the terminal device to report the random access-related information further include that a delay of a procedure of the random access of the terminal device exceeds a delay threshold.

8. The terminal device of claim 7, wherein the memory storing instructions, which when executed by the processor, further cause the processor to:
send a successful handover report containing the random access-related information to the network device in response to the random access of the terminal device satisfying at least one of the one or more conditions for reporting the random access-related information.

9. The terminal device of claim 7, wherein the one or more conditions for the terminal device to report the random access-related information include that a duration for the terminal device to access a target network exceeds a duration threshold.

10. The terminal device of claim 9, wherein:
the duration threshold is a pre-configured value for the terminal device, or
the duration threshold is configured according to a signaling or a broadcast sent by the network device.

11. The terminal device of claim 7, wherein:
the delay threshold is a pre-configured value for the terminal device, or
the delay threshold is configured according to a signaling or a broadcast sent by the network device.

12. The terminal device of claim 7, wherein:
a start time of the procedure of the random access is a time when the terminal device receives a signaling containing mobility control information or when the terminal device sends a message 1 for the random access, and
an ending time of the procedure of the random access is a time when the terminal device successfully completes the random access.

13. A network device, comprising:
a processor; and
memory storing instructions, which when executed by a processor, cause the processor to:
send configuration information to a terminal device, the configuration information being used to indicate one or more conditions for the terminal device to report random access-related information, and
receive a successful handover report that does not contain the random access-related information from the terminal device in response to a random access of the terminal device not satisfying the one or more conditions for reporting the random access-related information,
wherein the one or more conditions for the terminal device to report the random access-related information further include a delay of a procedure of the random access of the terminal device exceeds a delay threshold.

14. The network device of claim 13, wherein memory storing instructions, which when executed by the processor, further cause the processor to:
receive a successful handover report containing the random access-related information from the network device in response to the random access of the terminal device satisfying at least one of the one or more conditions for reporting the random access-related information.

15. The network device of claim 13, wherein the one or more conditions for the terminal device to report the random access-related information include that a duration for the terminal device to access a target network exceeds a duration threshold.

16. The network device of claim 15, wherein:
the duration threshold is a pre-configured value for the terminal device, or
the duration threshold is configured according to a signaling or a broadcast sent by the network device.

17. The network device of claim 13, wherein:
a start time of the procedure of the random access is a time when the terminal device receives a signaling containing mobility control information or when the terminal device sends a message 1 for the random access, and
an ending time of the procedure of the random access is a time when the terminal device successfully completes the random access.

* * * * *